United States Patent
Haas et al.

[15] 3,682,029
[45] Aug. 8, 1972

[54] BALANCED AND DOUBLE ACTION CUTTING APPARATUS

[72] Inventors: Edgar Haas, New York, N.Y.; Edward Kottsieper, Dresden Mills, Maine

[73] Assignee: Herman Schwabe Inc., Brooklyn, N.Y.

[22] Filed: April 13, 1970

[21] Appl. No.: 27,812

[52] U.S. Cl. ............................83/69, 83/8, 83/9, 83/554, 83/630
[51] Int. Cl. .............................................B26d 5/18
[58] Field of Search........83/630, 554, 524, 525, 526, 83/9, 8, 69

[56] References Cited

UNITED STATES PATENTS

| | | |
|---|---|---|
| 3,426,635 | 2/1969 | Nicklasson..............83/630 X |
| 3,524,374 | 8/1970 | Diolot.....................83/630 X |
| 2,532,672 | 12/1950 | Michael et al. ..........83/630 X |
| 3,183,743 | 5/1965 | O'Donnell et al........83/630 X |
| 2,928,305 | 3/1960 | Heth et al. ..............83/630 X |

*Primary Examiner*—James M. Meister
*Attorney*—James and Franklin

[57] ABSTRACT

An apparatus for cutting sheet materials comprises a support frame for supporting the material to be worked and a cutting tool operatively movably connected to the support frame and effective to move from a retracted position to a cutting position. Means are provided to drive the cutting tool without interruption in one continuous cutting cycle from a fully retracted position to a cutting position, then to an intermediate position between the cutting and retracted positions, then back to a cutting position substantially immediately, and thereafter to the fully retracted position. This is accomplished by a driving mechanism comprising conventional toggle arms driven by a piston which moves from a withdrawn position to a fully extended position and back to the withdrawn position during the cutting cycle. The toggle arms are driven past their position of alignment twice during the movement of the piston and this is effective to reciprocally drive the cutting tool twice into cutting position during a single cycle. As a result, the material is quickly cut at the same location twice in succession, thereby ensuring a complete and accurate severing action.

15 Claims, 8 Drawing Figures

INVENTORS
EDGAR HAAS
EDWARD KOTTSIEPER
ATTORNEYS

INVENTORS
EDGAR HAAS
EDWARD KOTTSIEPER
BY
ATTORNEYS

BALANCED AND DOUBLE ACTION CUTTING APPARATUS

This invention relates to an apparatus for automatically cutting sheets of material, and more specifically to an hydraulically operated die press which is effective to cut sheets twice at the same locations during one cutting cycle.

A typical apparatus for cutting sheet material employs what is known in the art as a short stroke technique. This particular technique comprises working a material between parts one of which, preferably the lower part, is preferably stationary, and the other of which moves in a direction toward the stationary part. At least one part comprises a cutting tool. The upper part is movably mounted, and is driven downwardly toward the stationary part by some driving mechanism.

The term "cutting" is here used broadly to include complete severing and partial severing or deforming (perforating, segmentally severing, forming fold lines in paperboard or the like, etc.).

Various types of driving mechanisms are employed for moving the upper part toward the stationary part. One typical mechanism comprises a pair of toggle arms pivotally connected together at adjacent ends and operatively connected respectively to the frame of the apparatus and to the movable part at the other ends of the arms. A moving mechanism such as a driving shaft is operatively connected to the two toggle arms at the joint thereof and is effective to move the toggle arms from a non-aligned position toward an aligned position. When the toggle arms are aligned with each other, or are close to that aligned position, the movable part engages the material to be cut and presses it against the fixed part with a force sufficient to enable the cutting tool to cut through the material. Thereafter the toggle arms are returned to their original non-aligned position, thereby retracting the movable part.

The moving mechanisms connected to the toggle arms take various forms. One typical form is that of a crank mechanism which comprises a linearly moving rod and a rotating cam or wheel operatively connected to the rod and effective to reciprocate it in such a direction as to move the toggle arms back and forth, thereby to move the part between cutting and retracted positions. In another embodiment a piston rod is connected to a hydraulic system and is actuated thereby to thrust from a withdrawn position to an extended position. This motion is imparted to the toggle arms and is effective to move these arms toward aligned condition. Subsequent withdrawal of the piston rod causes the toggle arms to again assume their original non-aligned position, thereby resulting in the movable part being withdrawn to a fully retracted position.

In all of these devices the movable part is moved from a fully retracted position to a cutting position and back to its retracted position in one continuous operating cycle. One difficulty encountered with such devices, particularly in cutting large sheets having a sizable width, is that the cutting action is not uniform, that is, the cutting tool provides a better cut at the peripheral portions of the plate which carries it than at the central portion thereof. This is generally due to the natural deformation of the carrying plate at its central portion during the application of the cutting force. As a result, in many cases a complete cut can only be ensured by repeating the cutting action. In present mechanisms a repeat cut can only occur if the carrying plate is brought to a fully retracted position before the cutting cycle is again begun. Obviously such a procedure is greatly disadvantageous to the manufacturer since it is time-consuming and therefore uneconomical. Moreover, quite often the exact cutting line is not maintained in the second cutting stroke; the material being cut is therefore seriously deformed, resulting in a large amount of waste.

It is the primary object of this invention therefore to provide an apparatus for cutting sheet materials which is capable of completing a second cutting stroke immediately after the first cutting stroke without fully retracting the cutting tool, and without interrupting a single continuous cutting cycle.

It is another object of this invention to provide a sheet material cutting apparatus capable of completing a second cutting stroke substantially immediately after a first cutting stroke while using a standard toggle arm driving mechanism.

It is a further object of the present invention to provide, in a sheet material cutting apparatus, means for driving the cutting tool at spaced locations and equalizing the drive thereof at those locations, thus providing for uniformity of cutting action over a large area.

The aforementioned problems are overcome and the above objects are satisfied by the provision in an apparatus for cutting sheet materials of a simple mechanism which enables a second cutting stroke to be effected immediately after a first cutting stroke, thereby ensuring an accurate and complete cut of the material. The apparatus comprises a frame and a cutting tool operatively movably carried on the frame, and means connected to the cutting tool and effective to drive it from a fully retracted position to a cutting position, and from that cutting position to a slightly retracted position intermediate the fully retracted position and the cutting position. The driving means is thereafter effective to drive the cutting tool again into a cutting position for a second cutting stroke, and then retract the cutting tool to a fully retracted condition where it is ready for the next cycle. The plurality of positions of the cutting tool just described are all achieved in a single continuous operating cycle.

The driving means comprises first and second toggle arm members operatively connected together at a first part thereof and adapted to pivotally move at that connected point. One of the toggle arm members is attached to the apparatus frame opposite the pivot joint, and the other of the toggle arm members is connected to the cutting tool opposite the pivot joint. The toggle arms operate in a conventional manner, that is, when they are in an aligned position relative to each other, the cutting tool is driven to its cutting position, and when these toggle arms are angularly positioned relative to each other, the cutting tool is in a withdrawn or retracted non-cutting position. A moving means comprises a piston and a fluid system operatively connected to the piston and effective to thrust it outwardly to an extended position and withdraw it to a retracted position in one continuous cycle. The length of piston stroke is set so that during the outward thrust of the piston the toggle arms are driven past their fully aligned position to a slightly angled position beyond the aligned position. This causes the cutting tool to strike the material to be cut and withdraw slightly, all during the outward thrust of the piston. The piston is then immediately withdrawn toward its retracted position thereby causing the toggle arms to again become aligned during the withdrawal motion of the piston. It is at this point that the cutting tool cuts the material for the second time in a given cycle. Continued withdrawal of the piston then causes the cutting tool to be withdrawn to its fully retracted position. By adjusting the length of piston stroke relative to the alignment position of the toggle arms, the degree of retraction of the cutting tool between cutting strokes may be varied to a desired extent.

In the preferred embodiment of the invention, two hydraulically operated cylinders having simultaneously operating pistons are positioned so as to impart a simultaneous moving force to the cutting tool at several locations during the cutting cycle. This ensures a balanced force on the cutting tool as it performs its cutting strokes. Preferably, the cylinders are mounted in a back-to-back relation and the pistons thrust outwardly in opposite directions, thereby operating toggle mechanisms positioned on opposite sides of the cutting tool. A mechanical coupling device is operatively connected to both piston members and is effective to mechanically guide the pistons for simultaneous movement during the cutting cycle.

To the accomplishment of the above and to such other objects as may hereinafter appear, the present invention relates to a deforming apparatus as defined in the appended claims, and as described in the following drawings in which:

Figure 1:
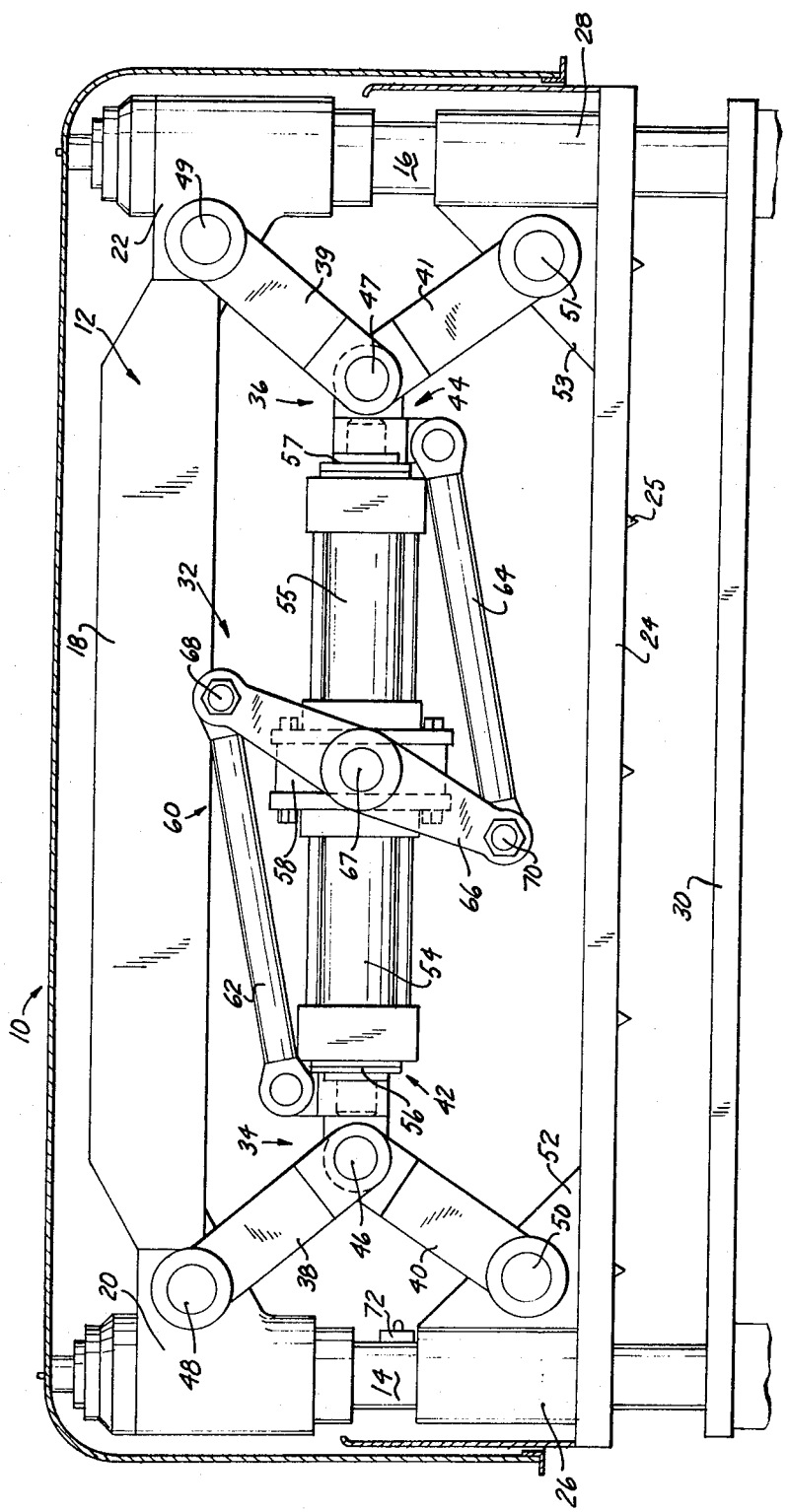
FIG. 1 is a side elevational view of an apparatus typical of the invention with the cutting tool in a retracted position.
Figure 2:
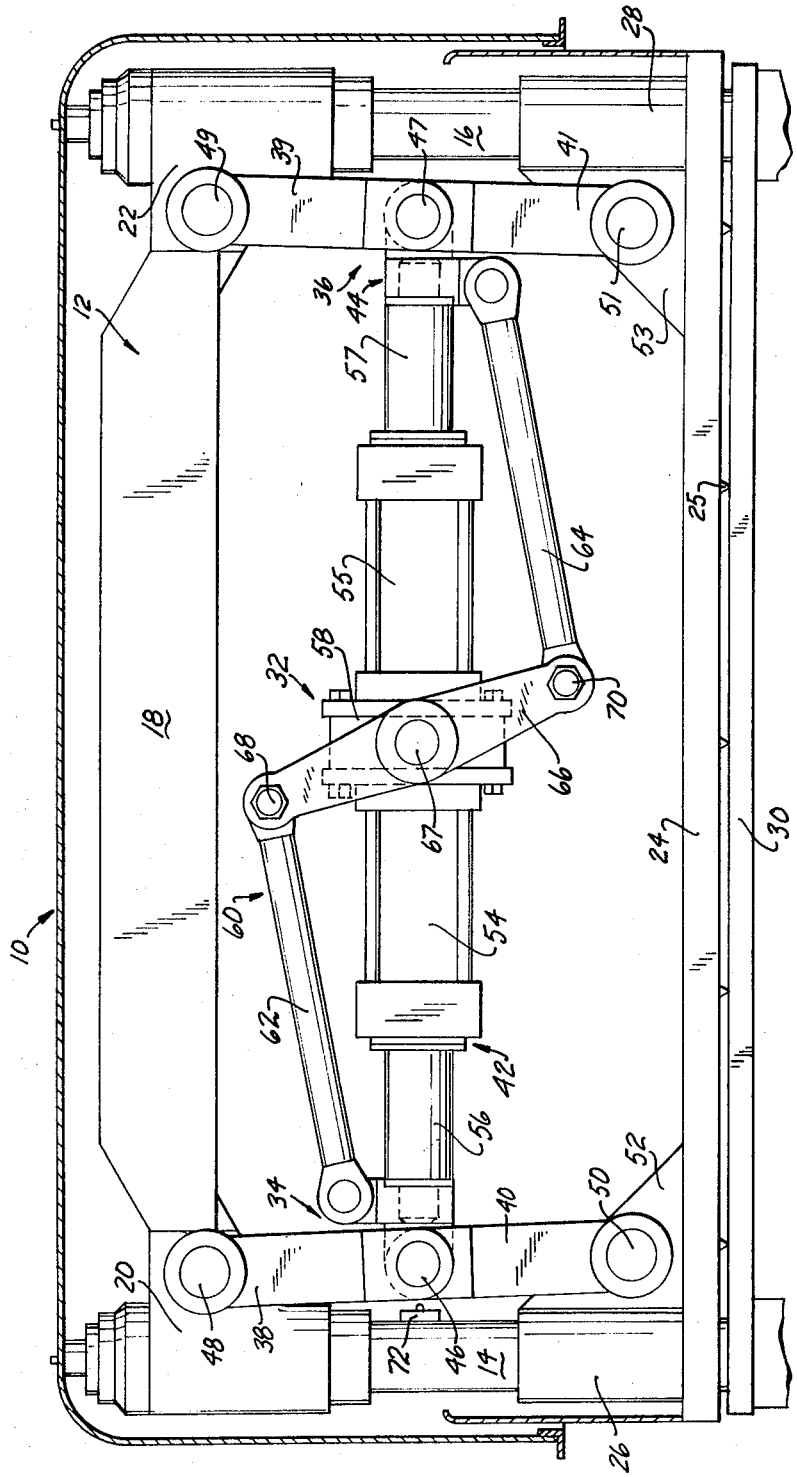
FIG. 2 is a side elevational view of the apparatus of FIG. 1 with the cutting tool in a cutting position.

Referring to the drawings, and specifically to FIGS. 1 and 2, there is illustrated a sheet cutting apparatus generally designated by the numeral 10. The apparatus 10 comprises the frame support generally designated by the numeral 12 which includes vertical support posts 14 and 16 and the transverse member 18. The transverse member 18 is connected to the vertical support posts 14 and 16 by upper head parts 20 and 22.

The apparatus 10 further includes a movable means shown here as a carrier plate 24 which carries a cutting die or rule 25. This plate 24 is operatively connected to the lower head parts 26 and 28 which are of a diameter large enough to slide upwardly and downwardly on the posts 14 and 16 respectively. A table 30 is fixedly attached to the posts 14 and 16 and is adapted to receive the cutting die 25 in a forceful engagement when the plate 24 is slidably moved downwardly as viewed in FIGS. 1 and 2 over the posts 14 and 16. When the die 25 is in such engagement with the table 30, as illustrated in FIG. 2, a material to be cut which is interposed therebetween is deformed to a desired shape, or, such as is often the practice with devices of this type, it is cut into a desired pattern or configuration.

A driving mechanism generally designated 32 is employed to drive the plate 24 from its retracted position to its cutting position. The driving mechanism 32 comprises toggle arm mechanisms designated respectively by the numerals 34 and 36. Each of these mechanisms 34 and 36 comprises upper toggle arms 38 and 39, lower toggle arms 40 and 41, and a hydraulically actuated driving means 42 and 44. The upper and lower toggle arms are pivotally connected to each other at or near their end sections such as at pivotal joints 46 and 47 while the upper toggle arms 38 and 39 are pivotally attached at the end sections opposite joints 46 and 47 to upper head parts 20 and 22 respectively such as at joints 48 and 49. The lower toggle arms 40 and 41 are similarly pivotally connected at joints 50 and 51 to winged braces 52 and 53. These latter braces are attached to and connect lower head parts 26 and 28 with the plate 24. Motion of the toggle arms 38 and 40 in a direction which is effective to shift those arms into a substantially aligned condition as shown in FIG. 2, is transmitted to the plate 24 through the connecting braces 52 and 53, thereby causing the plate 24 to move downwardly over the posts 14 and 16.

The driving means for moving the toggle arms comprise cylinders 54 and 55 each having pistons 56 and 57. The pistons 56 and 57 are connected to the toggle arms at joints 46 and 47 respectively. These pistons are thrust outwardly from a retracted position shown in FIG. 1 to an extended position which is slightly beyond the position shown in FIG. 2 during operation of the apparatus. Actuation of the pistons 56 and 57 occurs simultaneously by means of the hydraulic action of the driving system as will be hereinafter further explained.

A force equalizing mechanism generally designated by the numeral 60 comprises lever arms 62 and 64 and linking arm 66 pivotally mounted on axis 67. These components are interconnected for pivotal movement at joints 68 and 70. Lever 62 is connected to piston 56 while lever 64 is connected to piston 57, as shown. As a result of these connections and the pivotal joints between components, the mechanism 60 is effective to mechanically guide the pistons 56 and 57 for simultaneous movement between positions and thereby balances the operation of these pistons. Because of this mechanical linkage 60 one of the pistons when actuated cannot get ahead of the other in its outward movement, nor can either of the pistons move out of alignment relative to the other piston during the operation of the system. With this structure therefore an equal and simultaneous force is assured at a plurality of locations on the plate 24, thereby providing a balanced movement of that plate.

As illustrated in FIGS. 1 and 2, the driving mechanism 32 is suspended between the transverse cross bar 18 and the plate 24. This driving mechanism essentially floats in this position, supported solely by its connection to the toggle arms. This floating arrangement enables the pistons 56 and 57 to move slightly downwardly with lower toggle arms 40 and 41 when thrust outwardly. The entire driving mechanism 32, including the cylinders 54 and 55 and linking mechanism 60 also moves downwardly during this movement with the toggle arms 40 and 41. The cylinders 54 and 55 are interconnected by the brace 58 and are thereby adapted to move together during the operation of the apparatus.

The apparatus illustrated in FIGS. 1 and 2 is designed to ensure a complete cutting action for each cutting cycle. This is accomplished because the cutting die 25 carried by plate 24 is brought into engagement with the material placed on the table 30 twice in rapid succession in one continuous uninterrupted cycle of operation. This operation of the apparatus is best described by referring to FIGS. 5 through 8 which schematically illustrate this action.

Figure 4:
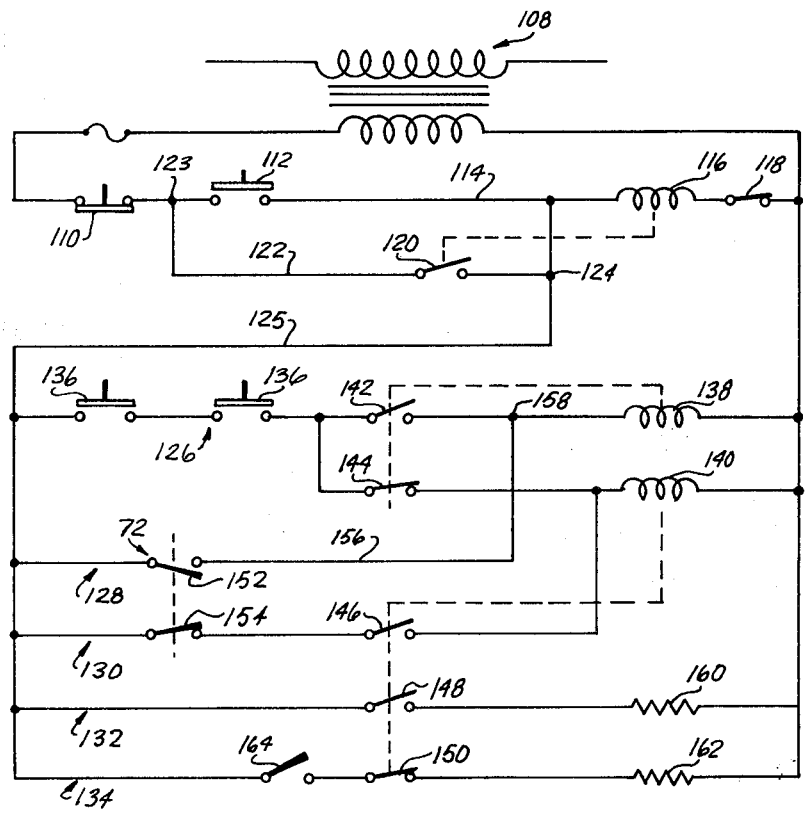
FIG. 4 is a schematic diagram of an electrical circuit employed to control the several electrical components of the system illustrated in FIG. 3.
Figure 5:
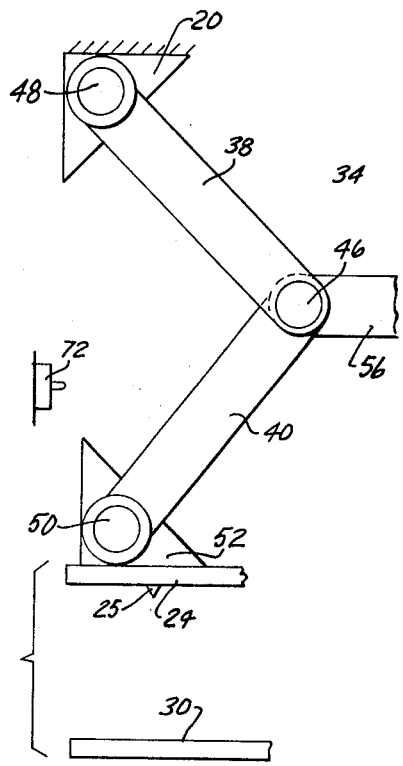
FIGS. 5 through 8 are schematic illustrations of the various positions of the driving mechanism employed to move the cutting tool between working and non-working positions.
Figure 6:
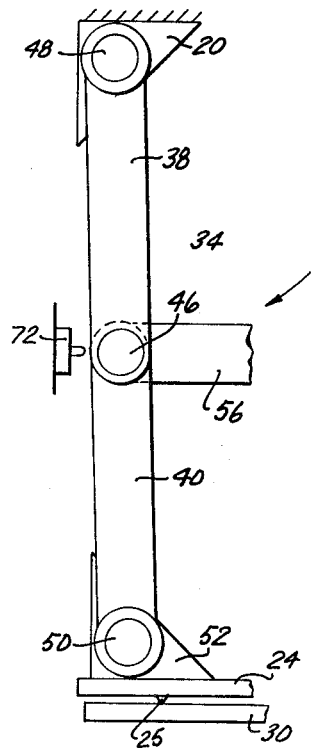
Figure 7:
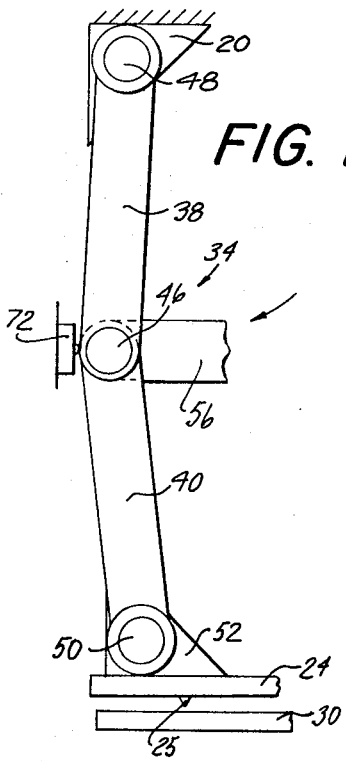
Figure 8:
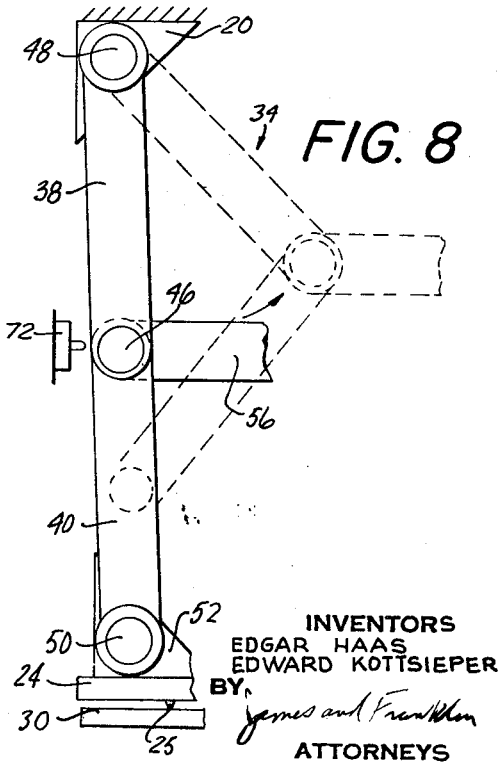

FIG. 5 represents the driving mechanism 34 in its fully retracted condition such as shown in FIG. 1. In this position the toggle arms 38 and 40 are in a non-aligned condition, and the cutting plate 24 is at the greatest distance from the table 30 that may occur during an operating cycle. When piston 56 is thrust outwardly, lower toggle arm 40 is moved downwardly relative to the other components and carries with it the plate 24. Such downward movement reaches a maximum point when upper and lower toggle arms 38 and 40 are substantially aligned as shown in FIG. 6. This is the "deforming" or "cutting" position of plate 24 and table 30. A material interposed therebetween would be compressed at this position by the cutting die 25, and deformation or cutting action occurs. However, due to the possible inaccuracy of the cutting die 25 or the carrier plate 24 or, more specifically, due to the distortion of the central portion of that large plate 24, when the compressive engagement occurs, the desired distortion or severing of the material placed between these parts may not be achieved. To overcome this particular difficulty, the fully extended position of the piston 56 is set so that the toggle arms are driven slightly past their aligned condition to a second non-aligned position shown in FIG. 7. In that position the plate 24 and cutting die 25 are retracted slightly to a position above the table 30. When the piston 56 reaches its fully extended position as shown in FIG. 7, a limit switch 72 is actuated by its engagement with the driving mechanism 34 and is thereby effective to produce an actuating signal. This signal is transmitted through electrical means such as illustrated in FIG. 4 to the hydraulic system shown in FIG. 3, and is effective to reverse the flow of fluid in that system. As a result of this reverse flow, the piston 56 is withdrawn from its extended position in a direction opposite to the direction of original movement. When being withdrawn the piston 56 again carries toggle arms 38 and 40 to their substantially aligned position as shown by solid lines in FIG. 8. This causes the plate 24 and die 25 to again contact the material placed on table 30 at exactly the same location as during the first cut. The result of the second engagement is that the cutting die 25 now cuts through or appropriately deforms every part of the material including those parts at which the full shear or deformation was not accomplished during the first cut. Continued movement of the piston 56 to its fully withdrawn position, as shown in FIG. 1, is illustrated by the broken lines in FIG. 8.

Figure 3:
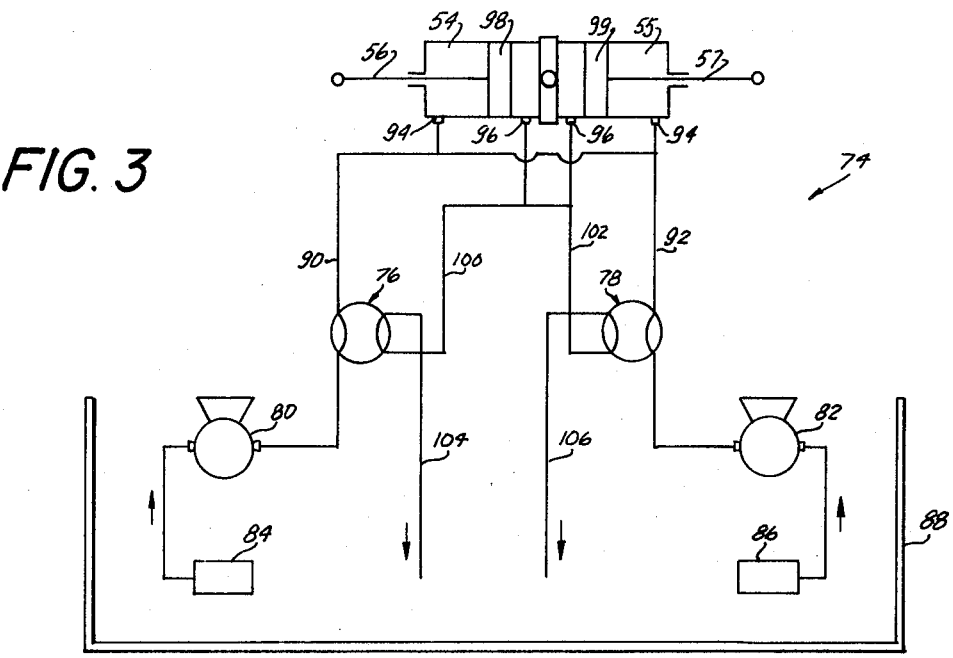
FIG. 3 is a schematic illustration of a fluid system employed in the actuation of the driving mechanisms of the apparatus shown in FIGS. 1 and 2.

The means for controlling the movement of the several pistons 56 and 57 is schematically illustrated in FIGS. 3 and 4. Referring to FIG. 3, an hydraulic system generally designated 74 comprises electrically operated four way valves 76 and 78, pumps 80 and 82, and filters 84 and 86. A fluid such as a liquid is held in the container 88 in direct contact with the filters 84 and 86. This fluid is pumped by the pumps 80 and 82 out of the container 88 through the valves 76 and 78 through lines 90 and 92 to a suitable opening at the cylinders 54 and 55. Each of the cylinders 54 and 55 is provided with two openings 94 and 96, the former openings communicating with the forward part of the piston walls 98 and 99, and the latter openings being positioned in communication with the rear part of those walls. In the position of the valve shown, lines 90 and 92 connect directly through the valves 76 and 78 respectively to the pump motors 80 and 82 respectively, and therefore pass the fluid from the container 88 into the cylinder so as to cause the pistons 56 and 57 to withdraw to the position shown. Openings 96 are connected through lines 100 and 102, valves 76 and 78 and lines 104 and 106 respectively back into the tank 88. These openings pass the fluid from the interior section of the cylinders 54 and 55 as it is forced out of cylinders by the moving pistons 98 and 99.

The hydraulic system 74 is illustrated in a condition in FIG. 3 which represents the fully retracted position of the plate 24. When it is desired to drive the plate 24 downwardly, valves 76 and 78 are electrically actuated to switch from the positions shown to opposite positions shown by broken lines. In these latter positions, the pumps 80 and 82 are connected to lines 100 and 102 respectively, and thus to openings 96. At the same valve position, lines 90 and 92 connect the openings 94 with the exhaust lines 104 and 106. Fluid flow is therefore reversed in the system, that is, fluid is forced into the openings 96 and out of openings 94, causing the pistons 56 and 57 to move outwardly to their extended position. When they reach that extended position limit switch 72 is actuated as explained with reference to FIG. 7, and causes the valves 76 and 78 again to assume the position shown in solid lines in FIG. 3. The pistons are thereafter driven to their withdrawn position.

An electrical circuit which can be used to drive the pump motors 80 and 82 and also to energize the valves 76 and 78 is shown schematically in FIG. 4. As there shown, the circuitry illustrated includes a voltage source, here shown as the transformer 108, having a secondary winding which is connected through a fuse to pushbuttons 110 and 112. As shown button 112 is normally open while button 110 is normally closed. Line 114 connects button 112 to a motor start coil 116 and through a normally closed overload relay switch 118. The starter coil 116 is effective when energized to drive the pump motors 80 and 82 in FIG. 3, and also to close the normally open relay contact designated by the numeral 120 in FIG. 4. This contact 120 is connected by line 122 to junction point 123 at one end, and to junction point 124 at the other end.

A line 125 is connected between junction point 124 and a plurality of circuit branches designated respectively by the numerals 126, 128, 130 and 132 and 134. Branch 126 includes the normally open pushbutton switches 136 which are connected in series with a relay coil 138 and a second relay coil 140, those two relay coils being connected in parallel with each other. The connection of switches 136 to those coils is made through the normally open relay contact 142 and the normally closed relay contacts 144 respectively, both of which are controlled by the relay coil 138. Three normally open relay contacts 146, 148 and 150 are controlled by the relay coil 140, and are shown in their normal positions, that is, when the plate 24 is in its fully retracted position. Branches 128 and 130 contain contact parts 152 and 154 of the limit switch 72 shown in FIG. 7. Part 152 is normally open for the retracted position of the plate 24 and is connected by line 156 to junction point 158 which is tied directly to coil 138. Branch 132 includes a coil 160 which controls the position of valves 76 and 78 in FIG. 3. This coil, when energized, causes the valves 76 and 78 to switch positions so that the fluid flow is reversed from that illustrated in FIG. 3, as above explained. Coil 162 in branch 134 also controls the position of valves 76 and 78, but it is employed to reverse the position of those valves from that obtained when coil 160 is energized. Branch 134 also includes a second limit switch 164 which is connected directly to coil 162 and which is opened when the plate 24 is in its fully retracted condition, but which is closed immediately when the pistons 56 and 57 begin their outward thrust.

Operation of the circuit of FIG. 4 is as follows: When it is desired to force the plate 24 downwardly button 112 is closed, causing the voltage at the secondary of the transformer 108 to be connected directly across relay coil 116. As a result, current flows through this coil and relay contact 120 is moved to a closed position. This causes the current flow through the coil 116 to continue even after button 112 is released. Current through coil 116 also begins the pumping action of motors 80 and 82.

In order for the fluid to flow in a direction such as to move the pistons 56 and 57 outwardly as desired, coil 160 must be energized, and this can only occur when contact 148 is closed. By then closing pushbuttons 136 (two are provided as a safety feature — the need for two-hand actuation ensures that the operator's hands are in a safe place) the voltage from the transformer 108 is also applied across coil 140 through the normally closed relay contact 144. Current through coil 140 causes contacts 146 and 148 to close, thereby closing branches 130 and 132. Current continues to flow through relay coil 140 through limit switch part 154 and contact 146 in branch 130 even after buttons 136 are released. This continued flow enables current to pass through the closed contact 148 to the coil 160. Energization of the coil 160 switches the position of valves 76 and 78 to that required for reverse fluid flow.

This condition is maintained until the pistons actuate limit switch 72. When that actuation occurs, part 152 is closed and part 154 is opened in branches 128 and 130 respectively. Current then flows through coil 138 via branch 128 and no longer flows in branch 130. Current through coil 138 causes contacts 144 to open, thereby preventing any possible current flow in coil 140 during this period. Without a current flow in coil 140, switch 150 reverts to its normally closed position in branch 134. Since limit switch 164 is automatically closed upon the movement of the pistons outwardly, current flows through relay coil 162 in response to the actuation of limit switch 72. This causes the valves to revert to the original position shown in FIG. 3, and reverses the flow of fluid in the system once again. The pistons are therefore withdrawn, and when they reach their full position of withdrawal, limit switch 164 is automatically opened, and no current flows in the system. The system is then interrupted and may only be actuated by again depressing buttons 136 when the next material piece is placed in the apparatus for processing.

From the foregoing, it is apparent that the apparatus of the invention is capable of imparting a double-cut at the same locations on a material processed therein within a short period of time, and during one continuous operating cycle. There is no need to interrupt the action of the pistons in the system, they being designed to coordinate with the toggle mechanism to provide a single smooth balanced stroking action to accomplish the desired results. Each workpiece is subjected to the double-acting cutting blades in a period which is substantially identical to the period required for an operating cycle before the innovations herein described were incorporated in such an apparatus. The apparatus therefore provides an accurate and complete cutting action in a brief period of time, and substantially eliminates time-consuming system shutdowns previously required to effect the same result.

It will be appreciated that a large number of modifications may be made in the apparatus of the invention without departing from the scope of the invention as defined in the appended claims. Purely by way of example, modifications such as the use of other fluid systems, or differently arranged driving mechanisms will be apparent to those skilled in the art.

We claim:

1. In an apparatus for cutting materials placed therein comprising a support frame for supporting said materials and a cutting means operatively movably connected to said support frame and effective to move toward and away from said materials; the improvement which comprises means operatively connected to said cutting means and effective in one cycle to drive said cutting means from a retracted position to a cutting position engaging said material, then to an intermediate position between said retracted position and said cutting position, then back to a cutting position and thereafter to said retracted position.

2. The apparatus of claim 1, in which said driving means comprises first and second toggle arm members operatively pivotally connected to each other at first parts thereof, one of said toggle arm members being operatively connected at a second part thereof spaced from its said first part to said frame, and the other of said toggle arm members being operatively connected at a second part thereof spaced from its first part to said cutting means, and moving means operatively connected to said toggle arm members at said pivotal connection and effective to move said members so that said second parts thereof move toward and away from each other, thereby to drive said cutting means toward said retracted and cutting positions respectively, said cutting means being at said cutting position when said toggle arm members are substantially aligned with each other, said moving means being effective during said cycle to move said first and second toggle arm members from a non-aligned position to an aligned position, then beyond said aligned position to a second non-aligned position, thereby driving said cutting means into engagement with said material at the same cutting location twice during said one cycle.

3. The apparatus of claim 2, in which said moving means comprises a piston means which moves from a withdrawn position to an extended position and back to said withdrawn position during one cycle.

4. The apparatus of claim 3, in which said moving means further comprises hydraulic actuating means effective to drive said piston means between said withdrawn and extended positions and electrical means operatively connected to said hydraulic means and effective when actuated to control the driving direction of said hydraulic means.

5. In the apparatus of claim 4, control means operatively connected to said support frame and positioned at said extended position of said piston means and effective when engaged by said piston means to produce an actuating signal effective to reverse the driving direction of said hydraulic means, thereby to automatically drive said piston means back toward its withdrawn position.

6. The apparatus of claim 2, in which said driving means comprises third and fourth toggle arm members operatively pivotally connected to each other at first parts thereof, said third toggle arm member being operatively connected at a second part thereof spaced from its said first part to said frame at a point spaced from the point of connection of said one of said toggle arm members, and said fourth toggle arm member being operatively connected at a second part thereof spaced from its said first part to said cutting means at a point spaced from the point of connection of said other of said toggle arm members, and second moving means operatively connected to said third and fourth toggle arm members at said pivotal connection, said second moving means being effective to drive said third and fourth toggle arms simultaneously with said one and said other toggle arms, thereby to impart a balanced moving force to said cutting means at a plurality of locations simultaneously.

7. In the apparatus of claim 6, equalizing means operatively pivotally connected to said first and second moving means and effective to mechanically guide said moving means for simultaneous movement between withdrawn and extended positions.

8. The apparatus of claim 7, in which said first and second moving means are supported on the frame of said members substantially solely by said toggle arm members.

9. The apparatus of claim 6, in which said first and second moving means are supported on the frame of said members substantially solely by said toggle arm members.

10. The apparatus of claim 6, in which said moving means comprises a piston means which moves from a withdrawn position to an extended position and back to said withdrawn position during one cycle.

11. The apparatus of claim 10, in which said moving means further comprises hydraulic actuating means effective to drive said piston means between said withdrawn and extended positions and electrical means operatively connected to said hydraulic means and effective when actuated to control the driving direction of said hydraulic means.

12. In the apparatus of claim 11, control means operatively connected to said support frame and positioned at said extended position of said piston means and effective when engaged by said piston means to produce an actuating signal effective to reverse the driving direction of said hydraulic means, thereby to automatically drive said piston means back toward its withdrawn position.

13. The apparatus of claim 7, in which said moving means comprises a base, first and second driving means movable out from and in toward said base and comprising said first and second moving means respectively, said equalizing means comprising a lever operatively connected to said base so as to pivot about an axis, and arms connected to said lever on opposite sides of said axis and connected respectively to said first and second driving means.

14. The apparatus of claim 1, in which said moving means comprises cylinder means, first and second piston means movable into and out of said cylinder means at spaced points on said cylinder means, and operative connections between said first and second piston means and first and second spaced points on said cutting means respectively, an equalizing means for said piston means, said equalizing means comprising a lever operatively connected to said cylinder means so as to pivot about an axis, and arms connected to said lever on opposite sides of said axis and connected respectively to said first and second piston means.

15. The apparatus of claim 14, in which said first and second piston means move into and out from said cylinder means at opposed points on said cylinder means.

* * * * *